United States Patent [19]

Komatani et al.

[11] 3,900,462

[45] Aug. 19, 1975

[54] PROCESS FOR CONCENTRATING A POLYSACCHARIDE SUSPENSION

[75] Inventors: Taro Komatani; Kazuo Yamada, both of Hyogo; Eizo Oguri, Kobe; Yasunori Tokuda, Hyogo, all of Japan

[73] Assignee: Takeda Chemical Industries, Ltd., Japan

[22] Filed: Oct. 16, 1973

[21] Appl. No.: 406,853

[30] Foreign Application Priority Data

Oct. 16, 1972 Japan.............................. 47-103378
Nov. 20, 1972 Japan.............................. 47-116467

[52] U.S. Cl............................................ 260/209 R
[51] Int. Cl.$^2$........................................ C08B 37/00
[58] Field of Search .............................. 260/209 R

[56] References Cited

UNITED STATES PATENTS

| | | | |
|---|---|---|---|
| 2,709,699 | 5/1955 | Wolf et al. ....................... | 260/209 R |
| 2,783,167 | 2/1957 | Lweberry et al. ................ | 260/209 R |
| 3,305,543 | 2/1967 | Haskell ............................ | 260/209 R |
| 3,562,176 | 2/1971 | Stancioff et al. ................. | 260/209 R |

*Primary Examiner*—Johnnie R. Brown
*Attorney, Agent, or Firm*—Wenderoth, Lind & Ponack

[57] ABSTRACT

A new process which provides a means to concentrate a polysaccharide suspension and facilitates the further purification of the polysaccharide by dissolving a water soluble salt of Calcium, Magnesium or Zinc in the Polysaccharide suspension; making the suspension alkaline to dissolve the polysaccharide, and adding an acid to the solution to cause the polysaccharide to separate out.

5 Claims, No Drawings

PROCESS FOR CONCENTRATING A POLYSACCHARIDE SUSPENSION

This invention relates to a process for concentrating a suspension of a thermally gelable polysaccharide composed predominantly of β-1,3-glucan.

Such thermally gelable polysaccharides are elaborated by *Alcaligenes faecales var. myxogenes* NTK–u, K and other organisms and prepared by the methods disclosed in U.S. Pat. No. 3,754,925 and French Pat. No. 7141577, or occur in *Poria cocos* Wolf [Agricultural Biological Chemistry 32–10, 1261–1269 (1968)].

The specific viscosity of the polysaccharides becomes high, when heated up to about 50°C, and once the polysaccharides gel at about 80°C, the specific viscosity could not decline, if the temperature drops, namely the polysaccharides form an irreversible gel at about 80°C. Said thermally gelable polysaccharides possess this temperature reactivity in common.

These polysaccharides are obtainable as a white or off-white powder and glucose is the main constituent sugar of the polysaccharide and, in infra-red analysis, the powders exhibit properties characteristics of β-1,3-glucan linkage at 890 cm$^{-1}$.

The microorganisms of the genus Alcaligenes which are capable of producing the indicated polysaccharides include, for example, *Alcaligenes faecalis var. myxogenes* NTK–u (ATCC 21680), a mutant strain which is obtained upon treatment of parent strain K with N-methyl-N-nitro-N-nitro-soguanidine and *Alcaligenes faecalis var. myxogenes* K. [See Agricultural Biological Chemistry, vol. 30, pages 196 et seq. (1966) by Harada et al.] Microorganisms of the genus Agrobacterium include such strains as ATCC 21679 and IFO 13127, which have been identified as *Agrobacterium radiobacter* and capable of producing polysaccharide. "IFO" denotes the deposit number at the Institute for Fermentation, Osaka, Japan.

For the production of objective polysaccharides, these microorganisms are incubated in a medium which contains assimilable carbon sources (e.g. glucose, sucrose, sorbitol, dextrin, starch hydrolyzates, organic acid), digestible nitrogen sources (e.g. inorganic ammonium salts, nitrates, organic nitrogen sources such as yeast extract, corn steep liquor, corn gluten, soy bean meal), inorganic salts (e.g. salts of manganese, iron, magnesium, calcium, zinc, cobalt). If desired, such trace growth promoters as vitaminaceous materials, nucleic acid-related compounds, and so forth, may be incorporated in the culture medium. In case of cultivation of said strain NTK–u, it is necessary to incorporate 50 to 1000 mcg/ml of uracil in the medium.

Although the preferred cultural conditions vary with different microorganisms employed, cultivation of the main culture for the production of said polysaccharides is generally effected at pH about 5 to 8 at a temperature of 20° to 35°C for 2 to 4 days, using such cultivation means as shake culture or submerged culture.

These polysaccharides have recently attracted a great attention as unique food materials, quality-modifying agents, food-ameliorating agents, low-calory foods and the like because of their unique gel strength, water-holding capacities, characteristic textures and low caloric values, etc.

Since these polysaccharides are soluble in a strong alkali and insoluble under neutral to acid conditions, they have heretofore been purified by taking advantage of this solubility behavior.

Thus, the conventional method comprises preparing a suspension containing such a polysaccharide in the first place; dissolving the polysaccharide by the addition of a strong alkali (e.g. NaOH); removing the alkali-insolubles from the solution; adding an acid such as HCl to percent residual solution to precipitate the polysaccharide; diluting the resultant liquid with water; centrifuging the dilution to remove the supernatant; desalting the sediment; concentrating the same; and finally dehydrating it. One of the disadvantages of this method is that when said polysaccharides are caused to separate out by the addition of an acid, their strong affinity for water causes a jelly-like fluid to form even at a low concentration (about 1 % (w/v)) and accordingly makes it very difficult to further concentrate the fluid. Another disadvantage is that because the thermal gelability of these polysaccharides deteriorates at about 40°C, it is impossible to separate and concentrate them while heating. Thus, this method can hardly be applied to an industrial process.

The present inventors conducted extensive studies to circumvent these disadvantages of the conventional method and to establish a commercially advantageous method. The studies led us to the discovery that if one follows the procedure of first dissolving, for example, a calcium salt, magnesium salt or zinc salt in a suspension of said polysaccharides under weakly acid to weakly alkaline conditions, then adjusting the same to an alkalinity of about 0.1–1N with respect to, say, caustic alkali and finally adding a mineral acid, e.g. HCl, to the solution, the polysaccharides precipitate as a firm concentrated gel, thereby facilitating the subsequent separation, disalting and purification operations. The above finding and subsequent studies have culminated in the present invention.

Thus, the main object of the present invention is to provide a process for concentrating a suspension of a thermaly gelable polysaccharide composed predominantly of β-1,3-glucan so as to ease the ensuing purification of said polysaccharide.

Another purpose is to provide a process to purify the polysaccharide.

The main object of the present invention is attained by dissolving a water-soluble salt of calcium, magnesium, or zinc in a suspension of one of said polysaccharides, then making the suspension alkaline so as to dissolve the suspended polysaccharide; adding an acid to the resultant solution to precipitate the polysaccharide; and finally separating and harvesting the same.

In the present invention, a suspension of the above-described polysaccharides is employed. If the concentration of the polysaccharide is excessively high, the fluid is too viscous to be handled. Therefore, a suspension containing not higher than 6.5 percent weight/volume (w/v) of the polysaccharides is usually employed.

A suspension of the polysaccharides at a concentration of not higher than 6.5 percent (w/v) is most efficiently concentrated according to the present invention. Since the fermentation methods of the above-mentioned French Patents give Polysaccharides PS and curdlan (hereafter referred to briefly PS and curdlan) in suspension, this fermentation broth may as such be employed in the practice of this invention. Such fermentation broths usually contain cells and other insolubles. If occasion demands to separate such matters before following concentration procedures, the suspension is subjected to a pretreatment procedure which comprises; alkalifying the suspension to above pH 12 so as to dissolve the suspended polysaccharide; adding calcium chloride or calcium hydroxide to lower the viscosity of said polysaccharide solution; removing the insoluble contaminants therefrom; and adding thereto an acid to regain a suspension of the polysaccharide.

This pretreatment procedure is particularly desirous in case where alkali solutions of polysaccharides are viscous, e.g. as high as hundreds of centipoises even when the concentrations of polysaccharides are of several percent, that it is extremely difficult to separate the cells and other insolubles from the solution. For example, in centrifugation procedure, the efficiency of centrifuge that can be attained is only about one-tenth of the efficiency to be attained when cells are removed from commonly-occuring culture broths the viscosities of which are in the neighborhood of about several centipoises. In this pretreatment procedure, the amount of calcium chloride or calcium hydroxide is desirably between 0.03 and 0.2 mol/liter relative to 1 percent by weight/volume (w/v), of the dissolving polysaccharide.

In the practice of this pretreatment, the viscosity of the alkaline solution before the addition of calcium salt is desirably as low as possible, say, about 140 centipoises or lower, and for that purpose, it is practical to keep the alkaline solution standing for some time before the addition of calcium salt.

In such a suspension of polysaccharide there is incorporated and dissolved a calcium salt, magnesium salt or zinc salt (hereinafter referred to as calcium salt or equivalent, if necessary). While the salt may be any of water soluble salts such as chloride, hydroxide, etc., the chloride is most desirable. Though the amount of salt varies with different types of salt and of polysaccharide, it is advisable to use between 0.03 and 0.75 mol/l. In particular in case of Magnesium salt the most desirable range is between 0.06 and 0.25 mol/l and in case of zinc salt, the most desirable range is between 0.35 and 0.45 mol/l. The addition in a smaller amount than 0.03 mol/l is undesirable, for when the fluid is made strongly alkaline in the subsequent step, its viscosity becomes too high. However, when the salt concentration reaches 0.03 moles/l or higher, for instance, in case of calcium salt, the viscosity of the alkaline solution of polysaccharides obtained in the following step remarkably decreases, making it easy to effect the separation of insoluble contaminants from the solution. In this connection, it is important that, after the addition of calcium salt or equivalent, the system should be sufficiently agitated to completely dissolve and disperse the salt into the suspension.

The suspension containing the calcium salt or equivalent is then adjusted to strong alkalinity by means of an alkali such as, NaOH or KOH. The pH thus adjusted should be at least above pH 12 and, preferably, above pH 13. Then, an acid is added to the solution to precipitate the polysaccharide. While the type of acid is largely optional, hydrochloric acid is preferable. The pH is usually adjusted below 10, and preferably near neutral to acid. This acid is added until the polysaccharide separates out. In this manner the objective polysaccharide is allowed to separate far more readily than in the absence of calcium salt or equivalent. This precipitate is so highly sedimentable that it can be easily separated out from the supernatant fluid and, since thus separated precipitates hold relatively less water, the subsequent concentrating procedure of the precipitates is efficiently effected. A process without employing calcium salt or equivalent gives only a very viscous, jelly-like polysaccharide precipitates containing a large amount of water when the polysaccharide is separated with the addition of an acid, and accordingly requires a great amount of effort in concentrating the suspension and in the subsequent dehydration, whereas the method of this invention affords precipitates of a lower water content, say, about one-half of that of products obtainable by conventional methods, with the result that the subsequent purification procedures including desalting, drying etc. are considerably facilitated.

The method of the present invention will be described in a further detail by experiments and working example.

In these experiments and example, PS was prepared according to Example A–4 of U.S. Pat. No. 3,754,925 (see Reference below), while the polysaccharide from *Poria cocos* Wolf was obtained by the manner disclosed in Agricultural Biological Chemistry 32–10, 1261–1269(1968).

REFERENCE

*Alcaligenes faecalis* var. *myxogenes* Strain NTK–*u* (IFO-13140) is inoculated in 30 ml. of a seed culture medium charged in a 200 ml.-Erlenmyer flask, the medium being composed of glucose (1.0 %), $(NH_4)_2HPO_4$ (0.15 %), $KH_2PO_4$ (0.1 %), $MgSO_4.7H_2O$ (0.05 %), $FeSO_4.7H_2O$ (0.005 %), $MnSO_4.7H_2O$ (0.002 %), $ZnCl_2$ (0.001 %), $CoCl_2$ (0.001 %), yeast extract (0.1 %), $CaCO_3$ (0.3 %), uracil (0.01 %) and water and being adjusted at pH 7.0. Cultivation is effected under shaking at 32°C for 24 hours.

A 2 ml.-portion of the resultant seed culture broth is inoculated in 20 ml. of a main culture medium charged in a 200 ml.-creased Erlenmyer flask, the medium being composed of glucose (10.0 %), $(NH_4)_2HPO_4$ (0.23 %), $KH_2PO_4$ (0.1 %), $MgSO_4.7H_2O$ (0.05 90), $FeSO_4.7H_2O$ (0.005 %), $MnSO_4.7H_2O$ (0.002 %), $ZnCl_2$ (0.001 %), $CoCl_2$ (0.001 %), $CaCO_3$ (0.3 %), uracil (0.01 %) and water and being adjusted at pH 7.0. Cultivation is carried out under shaking at 32°C for 90 hours.

The broths thus obtained in several such flasks are pooled. To 80 ml. of the broth is added 240 ml. of an aqueous 0.5N-NaOH solution, followed by thorough stirring until the produced polysaccharide is swollen. To the mixture is added 160 m. of water. The diluted solution is centrifuged at 12,000 rpm. for 10 minutes to remove the solid matters including the cells. The supernatant liquid is neutralized with a 3N-HCl, whereupon gel sediments separate. The sediments are collected by centrifugation and washed with water until the salts contained therein are removed. Then, the sediments are again centrifuged to collect the desired polysaccharide. Dehydration with acetone and drying under reduced pressure yield 4.4 g. of PS. The yield relative to the substrate glucose is 55 percent.

EXPERIMENT A

Effect of Pretreatment of Polysaccharide Suspension.

A–1. The amount of $CaCl_2$ versus the viscosity of the alkali solution of polysaccharide.

The PS fermentation broth obtained by the method described in Reference was diluted with water and 10N-NaOH was added to portions of the diluted broth in amounts that could give the alkali concentrations of 0.4N and 0.8N, respectively.

The systems were stirred for a few hours to obtain alkali solutions having the PS concentration of 1.5 %(w/v). Though the viscosities of each dilution at the start of alkali dissolution were significantly high, they dropped gradually with the lapse of dissolution time and reached certain constant values of about 80 to 90 centipoises in about a few hours. To each of the alkali solutions of PS which had thus been equilibrated, there were added varying amounts of $CaCl_2 \cdot 2H_2O$, i.e. from 0.5 percent (w/v) (0.034 mole/liter) to 6.0 percent (w/v) (0.276 mole/liter). The resultant viscosity changes of the alkali solutions of PS are shown in Table 1.

of the thermally gelable polysaccharide (main ingredient Pachyman) contained in *Poria cocos* Wolf) as caused by the addition of $CaCl_2$ Thirty grams of the powder obtained by alkali extraction of a crude preparation of *Poria cocos* Wolf was evenly suspended in water and dissolved with NaOH to give 1000 ml. of a 0.4N solution. In this state, the alkali solution of polysaccharide had a viscosity of 18 centipoises. The viscosity of the solution was depressed to 5 centipoises when 0.1 mole of $CaCl_2$ was added and dissolved.

EXPERIMENT B

Effect of Water-soluble Salt of Calcium, Magnesium and Zinc on Concentrating Polysaccharide Suspension B-1 Experiment 1

The amounts of $CaCl_2$ and the viscosity of the alka-

Table 1

Changes in viscosity (cps.) of alkali solutions of PS by the addition of varying amount of $CaCl_2$
Amount of $CaCl_2 \cdot 2H_2O$

| %, (w/v) | 0 | 0.5 | 0.75 | 1.0 | 1.25 | 1.5 | 2.0 | 2.5 | 4.3 | 6.0 |
|---|---|---|---|---|---|---|---|---|---|---|
| Per percent PS(moles/liter) | 0 | 0.023 | 0.034 | 0.046 | 0.057 | 0.068 | 0.092 | 0.115 | 0.203 | 0.276 |
| Viscosities of PS system as dissolved in 0.4N NaOH (cps.) | 83 | 91 | 16 | 16 | 16 | 16 | 21 | 40 | 11 | 11 |
| Viscosities of PS system as dissolved in 0.8N NaOH (cps.) | 89 | 1880 | 21 | 15 | 13 | 16 | 16 | 20 | — | — | cps: centipoises

The above results indicate that whereas the viscosity of an alkali solution of PS is rather increased when the amount of $CaCl_2$ is small, a significant depression of viscosity can be attained by the addition of 0.045 mole/liter or more of $CaCl_2$ when the PS concentration is 1.5 percent (w/v), i.e. 0.03 mole/liter of the solution of $CaCl_2$ relative to 1 percent (w/v) of PS.

A-2. The amount of $Ca(OH)_2$ versus the viscosity of the alkali solution of polysaccharide Purified PS powder was evenly suspended in water and dissolved in 0.4N NaOH. The concentration of PS was 2 percent (w/v). To this alkali solution of PS was added a varying amount of $Ca(OH)_2$ as suspended in a small amount of water as indicated in Table 2 and the viscosity of the solution was then measured.

line solution and of the neutralized suspension of PS.

1. The amounts of $CaCl_2$ added and the viscosities of the alkaline solution (0.2N NaOH) and of the neutralized suspension of PS when the initial concentration of PS is 1.5 percent.

The powder of PS was suspended evenly in water to prepare a 1.5 percent suspension and $CaCl_2$ was dissolved therein. The solution was then rendered alkaline to 0.2 N with respect to NaOH and allowed to stand at 30°C for 1 hour. The viscosity of this alkaline solution was measured and, then, the PS was caused to separate by the addition of 4 N HCl (at pH 6). Then, the viscosity of this neutralized suspension of PS was measured. Viscosity measurements were made by means of Tokyo Table 2

| Amount of $Ca(OH)_2$ | (%, w/v) | 0 | 0.15 | 0.25 | 0.35 | 0.45 | 0.50 | 0.55 | 0.65 | 0.75 | 0.85 | 1.0 | 1.5 | 2.0 | 3.0 |
|---|---|---|---|---|---|---|---|---|---|---|---|---|---|---|---|
| | Per 1% PS (mole/liter) | 0 | 0.01 | 0.017 | 0.024 | 0.031 | 0.034 | 0.036 | 0.044 | 0.050 | 0.058 | 0.068 | 0.100 | 0.135 | 0.200 |
| Viscosity of the alkali solution of PS(c.p.s.) | | 30 | 2000 | 3000 | 5000 | 100 | 73 | 22 | 4.8 | 4.3 | 4.0 | 4.0 | 4.0 | 4.2 | 4.0 |

In this instance, the viscosity starts a gradual depression when the amount of $Ca(OH)_2$ reaches about 0.03 mole/liter per percent PS.

A-3. The changes in viscosity of the alkali solution

Keiki Model B viscosimeter within the indicated range of 60–6 RPM. The results are set forth below in the table. In the table, w/v means weight/volume percentage (The same applies hereafter).

Table 3

| Amount of CaCl$_2$·2H$_2$O added | mole/l | 0 | 0.01 | 0.02 | 0.03 | 0.045 | 0.06 | 0.075 | 0.09 | 0.12 | 0.15 |
|---|---|---|---|---|---|---|---|---|---|---|---|
|  | %, (w/v) | 0 | 0.15 | 0.30 | 0.44 | 0.66 | 0.88 | 1.1 | 1.32 | 1.76 | 2.21 |
| Viscosity of alkaline solution (0.2 N NaOH) (centipoises) |  | 15.8–16.0 | 42.5–92.0 | 4.5–18.0 | 1.3–3.5 | 1.5–2.3 | 1.4–2.1 | 0.8–1.6 | 0.7–1.3 | 0.5–1.3 | 0.5–1.3 |
| Viscosity of neutralized suspension of PS (centipoises) |  | 5,000–30,000 | 3,200–19,000 | 1,260–11,000 | 700–5,400 | 265–1,500 | 52–250 | 5.8–15.0 | 4.3–11.0 | 3.1–7.5 | 2.6–5.9 |

The above results indicate that, with respect to the amount of CaCl$_2$ added, the viscosity of the alkaline solution has a certain peak and if CaCl$_2$ is added in concentrations beyond a threshold corresponding to this peak and PS is then permitted to separate within the low-viscosity range beyond said peak, the operation is facilitated. Furthermore, even when the concentration of PS is fairly high, the addition of CaCl$_2$ results in a substantial viscosity reduction.

B–2. The amounts of CaCl$_2$ added and the sedimentability of PS and the concentration of PS in sendimentation 1. The powder of PS was suspended evenly in water (1.5 percent (w/v)) and, then, CaCl$_2$ was added and dissolved therein to varying concentrations as indicated below in the table. Each of the solutions was rendered alkaline (to 0.2 N NaOH) and allowed to stand at 30°C for 1 hour. Then, 4N HCl was added to the solution to cause the PS to separate (pH 6). The solution was then diluted to a PA concentration of 0.3 percent (w/v) and the sedimentation rate and concentration efficiency of the dilution were examined.

The results are set forth in the following Table 4.

Table 4

|  | Amount CaCl$_2$·2H$_2$O added | moles/l | 0 | 0.03 | 0.06 | 0.09 | 0.12 | 0.15 | Conditions |
|---|---|---|---|---|---|---|---|---|---|
|  | Standing time, in hrs. | %, w/v | 0 | 0.44 | 0.88 | 1.32 | 1.76 | 2.21 |  |
|  |  |  | ml. | ml. | ml. | ml. | ml. | ml. |  |
|  | 0 |  | 100 | 100 | 100 | 100 | 100 | 100 | Container: |
| Sedimentation | 0.5 |  | 96 | 96 | 94 | 54 | 52 | 23 | 100 ml calibrated |
| volume of PS | 1.0 |  | 92 | 92 | 88 | 44 | 36 | 18 | cylinder |
|  | 2.0 |  | 84 | 83 | 74 | 39 | 28 | 17 | Height of liquid |
|  | 3.0 |  | 74 | 72 | 61 | 35 | 25 | 17 | layer: 16 cm |
|  | 4.0 |  | 69 | 62 | 55 | 32 | 24 | 17 | Concentration of |
|  | 5.0 |  | 62 | 58 | 48 | 30 | 23 | 17 | PS: 0.3 %(100 ml.) |
| Concentration of PS in centrifugal sediment, %, (w/v) |  |  | 1.90 | 2.67 | 3.07 | 3.59 | 4.23 | 4.77 | Room temperature 5500 G 10 min. |

The above results indicate that as the amount of CaCl$_2$ is increased, an increasing amount of PS finds its way into the sedimental portion, that is to say the sedimentation rate of PS is improved and the operation is made easier. It has also been found that as the amount of CaCl$_2$ increases, the concentration of the solution can be effected with greater ease.

2. The powder of PS was suspended evenly in water in varying amounts as shown below and, then CaCl$_2$ was added and dissolved therein to varing concentration as indicated in the Table 5. Each of the solutions was rendered alkaline (0.2N NaOH) and allowed to stand at 30°C for 1 hour. Then, 4N-HCl was added to the solution to cause PS to separate (pH 6.0), which was centrifuged with 8,500 G for 10 minutes.

PS concentrations percent (w/v) in the resultant cakes were measured.

Table 5

| Amount of CaCl$_2$.2H$_2$O | mole/ | 0 | 0.03 | 0.09 | 0.15 | 0.45 | 0.75 | 1.2 |
|---|---|---|---|---|---|---|---|---|
| Starting PS concentration % (w/v) | % w/v | 0 | 0.44 | 1.32 | 2.2 | 6.6 | 11.0 | 17.6 |
| 0.68% |  | 1.45 | 2.40 | 4.75 | 6.48 | 6.25 | — | — |
| 1.35 |  | 2.16 | 3.25 | 5.50 | 7.00 | 6.55 | — | — |
| 1.80 |  | 2.72 | 3.95 | 6.00 | 7.01 | 6.79 | 6.55 | 5.72 |
| 2.70 |  | 3.69 | 4.33 | 6.34 | 7.49 | 7.38 | 6.98 | 6.09 |
| 4.50 |  | 5.45 | 6.13 | 7.87 | 8.50 | 8.40 | 7.99 | 7.08 |
| 6.00 |  | 7.20 | 7.70 | 9.18 | 9.70 | 9.40 | 8.42 | 8.03 |
| 6.50 |  | 7.35 | 7.80 | 9.21 | 9.65 | 9.36 | 8.44 | 8.12 |

Note:
When the starting PS concentration exceeded 6.5 %(w/v), the viscosity of PS suspension was so high that the experiment could hardly be conducted.

Table 5 shows that as the amount of CaCl$_2$ increases, the sedimentability of PS becomes better and the concentration of PS in centrifuged cakes becomes higher. But when the amount of CaCl$_2$ exceeds 0.75 percent (w/v) the efficiency of concentrating PS in terms of CaCl$_2$ remarkably drops.

B–3. The viscosities of a neutralized suspension of PS with acid and the types of calcium salt The PS powder was suspended evenly in water to prepare a 1.5 percent (w/v) suspension. Then, one of the calcium salts indicated below in the table was incorporated and suspended in the above suspension, in the amount of 0.075 mole/l (pH of the suspension after this addition is indicated in the table as initial pH.). The suspension was rendered alkaline to 0.2N in terms of NaOH and, after 1 hour's standing at 30°C, its viscosity was measured. Then, the PS was caused to separate by the addition of 4N HCl (pH 6) and the viscosity of the resultant suspension of PS was measured. The effects of addition of these various calcium salts were then compared with one another. The results are set forth below.

Table 6

| Ca Salt | Amount of Ca salt moles/l (w/v %) | Initial pH, immediately after addition of Ca salt | Viscosity of alkaline solution (centipoises) | Viscosity of neutralized suspension of PS (centipoises) |
|---|---|---|---|---|
| $CaCl_2 \cdot 2H_2O$ | 0.075 (1.1) | 6.3 | 0.8–1.6 | 5.8–15 |
| $Ca(OH)_2$ | 0.075 (0.56) | 13.0 | 4.1–4.3 | 32–112 |
| $CaCO_3$ | 0.075 (0.75) | 8.0 | 13.3–15 | 2,400–19,000 |
| $CaHPO_4 \cdot 2H_2O$ | 0.075 (1.29) | 10.0 | 20–23 | 3,500–35,000 |

It will be apparent from the above experiment that the most effective calcium salt is $CaCl_2 \cdot 2H_2O$, followed by $Ca(OH)_2$.

B–4. Metal salts other than calcium salts

1. The amounts of $MgCl_2$ added and the viscosities of the NaOH-alkaline solution and of the neutralized suspension of PS The PS powder was suspended evenly in water to prepare a 1.5 percent (w/v) suspension and $MgCl_2$ was dissolved in aliquots of the suspension to the concentrations indicated below in the Table. Each of the solutions was alkalinized to 0.2N NaOH and allowed to stand at 30°C for 1 hour. The viscosity of the alkaline solution was measured. Then, 4N HCl was added to the solution to precipitate the PS(pH 6) and the viscosity of the resultant suspension of PS was measured.

The results are set forth in the following table.

Table 7

| Amount of $MgCl_2 \cdot 6H_2O$ added | Mole/l | 0 | 0.0089 | 0.0157 | 0.0255 | 0.0442 | 0.060 | 0.0738 | 0.133 | 0.25 | 0.5 | 0.75 |
|---|---|---|---|---|---|---|---|---|---|---|---|---|
| | %, w/v | 0 | 0.18 | 0.32 | 0.54 | 0.9 | 1.2 | 1.5 | 2.7 | 5.3 | 10.6 | 15.9 |
| Viscosity of 0.2 N NaOH-alkaline solution (centipoises) | | 15.8–16 | 25–43 | 51–115 | 75–200 | 94–275 | 69–258 | 4–13 | 2.4–5.8 | 2.1–3.6 | 2.0–2.7 | 2.1–2.5 |
| Viscosity of neutralized suspension of PS (centipoises) | | 5000–30000 | 2500–18000 | 1160–11140 | 1000–8000 | 1040–10000 | 81–350 | 2.9–9 | 1.5–1.8 | 2.1–2.4 | 1.9–2.2 | 1.8–2.3 |

2. The amounts of $ZnCl_2$ added and the viscosities of the NaOH-alkaline solution and of the neutralized suspension of PS The PS powder was suspended evenly in water and $ZnCl_2$ was incorporated and dissolved in aliquots of the suspension to the concentrations indicated below in the table.

Each of the fluids was neutralized to pH 7 with NaOH and, then, alkalinized to 0.2N NaOH. The solution was allowed to stand at 30°C for 1 hour and its viscosity was measured (at this stage, the concentration of PS was 1.5 percent). Then, the PS was precipitated by the addition of 4N HCl (at pH 6) and the viscosity of the neutralized suspension of PS was measured. The results are set forth below.

Table 8

| The amount of $ZnCl_2$ added | moles/l | 0 | 0.0147 | 0.0294 | 0.0587 | 0.1173 | 0.176 | 0.264 | 0.352 | 0.44 | 0.514 |
|---|---|---|---|---|---|---|---|---|---|---|---|
| | %, w/v | 0 | 0.2 | 0.4 | 0.8 | 1.6 | 2.4 | 3.6 | 4.8 | 6 | 7 |
| Viscosity of 0.2 N NaOH-alkaline solution (centipoises) | | 15.8–16 | 13.6–14 | 21–22.5 | 42–60 | 200–575 | 840–3,000 | 180–1,600 | 4.5–11.6 | 110–200 | 223–300 |
| Viscosity of neutralized suspension of Pachyman (centipoises) | | 5,000–30000 | 820–6200 | 1,140–10800 | 950–5200 | 1,240–7000 | 1,060–10400 | 1,000–6400 | 3.8–13.8 | 65–400 | 80–600 |

The above results indicate that the effect of Mg and Zn salts upon PS is analogous to the effect of Ca salts. Thus, these metal salts are also applicable to the process of the present invention.

B–5. The amounts of $CaCl_2$ added and the viscosities of the alkaline solution and of polysaccharide-containing liquid after precipitation (Thermally gelable polysaccharide occurring in Poria cocos Wolf (main constituent: Pachyman) was employed).

In 1000 ml. of water was evenly suspended 30 g. of Poria cocos Wolf powder.

The suspension was then alkalinized to 0.4N NaOH, whereby the powder was dissolved (24 hours). With the addition of diatomaceus earth as a filter aid, the solution was filtered to obtain 900 ml. of filtrate. To this filtrate was added 4N HCl, whereupon the polysaccharide was caused to separate out (pH 6). In this liquid was dissolved $CaCl_2 \cdot 2H_2O$ to the concentrations indicated below in the table. Each of the solutions was rendered alkaline to 0.2N NaOH and allowed to stand at 30°C for 1 hour. The viscosity of the solution was then measured. Then, 4N HCl was added to the solution to precipitate the polysaccharide (pH 6) and the viscosity of the resultant liquid was measured. The results are set forth below.

Table 9

| The amount of CaCl₂.2H₂O | mole/l | 0 | 0.01 | 0.02 | 0.03 | 0.06 | 0.09 | 0.12 |
|---|---|---|---|---|---|---|---|---|
| | % w/v | 0 | 0.15 | 0.30 | 0.44 | 0.88 | 1.32 | 1.76 |
| Viscosity of 0.2 N NaOH-alkaline solution (centipoises) | | 40 – 44 | 740 – 3300 | 1500 – 5300 | 1020 – 3500 | 1000 – 3400 | 640 – 1500 | 1060 – 2900 |
| Viscosity of neutralized suspension of PS (centipoises) | | 6000 – 51000 | 5300 – 42000 | 1900 – 15500 | 1260 – 6600 | 1100 – 6000 | 1000 – 6400 | 1100 – 6800 |

The above results indicate that just as in the case of PS powder, the addition of $CaCl_2$ causes reductions in viscosity. This fact suggests that the effect of addition of $CaCl_2$ is common to the thermally gelable polysaccharides composed predominantly of β-1,3-glucan.

EXAMPLE

A. Pretreatment of Polysaccharide suspension 1,000,000 Parts by volume of PS fermentation broth (PS concentration: 3.4 percent (w/v) was treated with NaOH while stirring at 30°C for 5 hours, to give 2,000,000 parts by volume of an alkali solution having a final PS concentration of 1.7 percent (w/v) and an alkalinity of 0.4N. The viscosity of this solution was 50 centipoises. Then, 30,000 parts by weight (0.06 mole/l/percent PS) of $CaCl_2.2H_2O$ was added in the form of its solution to the above obtained PS alkali solution.

After 20 minute's stirring, the viscosity of the solution was found to be 5 centipoises. The alkali solution whose viscosity had thus been depressed was centrifuged at 8000 G by means of disk-bowl centrifuge to remove the insoluble impurities which was composed mostly of cells and $Ca(OH)_2$. This procedure yielded 1,800,000 parts by volume of a PS solution [PS concentration: 1.7 percent (w/v)]. 4N HCl was added to this solution to cause the PS to separate out. Thus, 2,000,000 parts by volume of a PS suspension [pH 6.0, PS concentration: 1.5 percent (w/v)]. This PS suspension was subjected to the concentration procedure according to the method of the present invention.

B. Concentration of PS suspension

In the PS suspension [PS concentration: 1.5 percent (w/v)] obtained by the pretreatment in Step A was dissolved $CaCl_2.2H_2O$ to a concentration of 0.09 moles/l [$CaCl_2.2H_2O$ concentration: 1.32 percent (w/v)] and the solution was made up to an alkali solution of 0.2N NaOH. After keeping 1 hour at 30°C, HCl was added to the solution to cause PS to separate (pH 6.0) and for the purpose of desalting and washing, the system was diluted with water to 10,000,000 parts by volume. The dilution was then desalted, washed and concentrated by means of a disk bowl centrifuge to obtain 1,000,000 parts by volume of concentrate (I) [PS concentration: 2.8 percent (w/v)].

The concentration was diluted again with water and further concentrated and separated using the same centrifuge, whereupon 700,000 parts by volume of concentrate (II) [PS concentration: 3.8 percent (w/v)] was obtained. This concentrate was dehydrated with a spray dryer to obtain 27,000 parts by weight of dry powder (purity of PS: 95 percent; water content 5 percent).

In the above Example, the relationship between part(s) by weight and part(s) by volume is the same as that between gram(s) and milliliter(s).

What we claim is:

1. A process for concentrating a suspension of a thermally gelable polysaccharide composed predominantly of β-1,3-glucan, which comprises dissolving the chloride or hydroxide of calcium, magnesium or zinc in an amount between 0.03 and 0.75 mol/l in a suspension of said polysaccharide; then making the suspension alkaline to a pH above 12 so as to dissolve the suspended polysaccharide; adding an acid to the resultant solution to precipitate the polysaccharide: and finally recovering the polysaccharide.

2. A process according to claim 1, wherein the amount of magnesium salt is between 0.06 and 0.25 mol/l.

3. A process according to claim 1, wherein the amount of zinc salt is between 0.35 and 0.45 mol/l.

4. A process according to claim 1, wherein the concentration of a thermally gelable polysaccharide in the starting suspension is not higher than 6.5 percent (weight/volume).

5. A process according to claim 1, wherein the starting suspension is purified prior to subjecting it to said concentration procedure by making the suspension alkaline to a pH above 12, so as to dissolve the suspended polysaccharide; adding to the resultant solution 0.03 to 0.2 mol/liter per percent of said polysaccharide, of calcium chloride or calcium hydroxide to lower the viscosity of said polysaccharide solution; removing the insoluble contiminants therefrom; and adding thereto an acid to regain a suspension of the polysaccharide.

* * * * *